US009943822B2

(12) United States Patent
Hattori et al.

(10) Patent No.: US 9,943,822 B2
(45) Date of Patent: Apr. 17, 2018

(54) NANOMETER-SIZE-PARTICLE PRODUCTION APPARATUS, NANOMETER-SIZE-PARTICLE PRODUCTION PROCESS, NANOMETER-SIZE PARTICLES, ZINC/ZINC OXIDE NANOMETER-SIZE PARTICLES, AND MAGNESIUM HYDROXIDE NANOMETER-SIZE PARTICLES

(71) Applicant: NATIONAL UNIVERSITY CORPORATION EHIME UNIVERSITY, Matsuyama-shi, Ehime-ken (JP)

(72) Inventors: Yoshiaki Hattori, Matsuyama (JP); Shinfuku Nomura, Matsuyama (JP); Hiromichi Toyota, Matsuyama (JP); Shinobu Mukasa, Matsuyama (JP)

(73) Assignee: NATIONAL UNIVERSITY CORPORATION EHIME UNIVERSITY, Matsuyama-shi, Ehime-ken (JP)

( * ) Notice: Subject to any disclaimer, the term of this patent is extended or adjusted under 35 U.S.C. 154(b) by 93 days.

(21) Appl. No.: 15/049,243

(22) Filed: Feb. 22, 2016

(65) Prior Publication Data
US 2016/0194213 A1 Jul. 7, 2016

Related U.S. Application Data

(62) Division of application No. 14/114,033, filed as application No. PCT/JP2012/002799 on Apr. 24, 2012, now Pat. No. 9,440,213.

(30) Foreign Application Priority Data

Apr. 28, 2011 (JP) ................................ 2011-101531

(51) Int. Cl.
*C01F 5/14* (2006.01)
*B01J 19/12* (2006.01)
(Continued)

(52) U.S. Cl.
CPC ............. *B01J 19/12* (2013.01); *B01J 19/088* (2013.01); *B01J 19/126* (2013.01); *B22F 9/14* (2013.01);
(Continued)

(58) Field of Classification Search
CPC ........ B01J 19/12; B01J 19/088; B01J 19/126; B01J 2219/0811; B01J 2219/082;
(Continued)

(56) References Cited

U.S. PATENT DOCUMENTS 5,143,965 A 9/1992 Mertz
2006/0082278 A1 4/2006 Lee et al.
(Continued)

FOREIGN PATENT DOCUMENTS

JP 6-504027 A 5/1994
JP 2005-108600 A 4/2005
(Continued)

OTHER PUBLICATIONS

Yoshiaki Hattori, et al., "Optimization and analysis of shape of coaxial electrode for microwave plasma in water", Journal of Applied Physics, Mar. 18, 2010, pp. 063305-1 to 063305-8, vol. 107.
(Continued)

*Primary Examiner* — Xiuyu Tai
(74) *Attorney, Agent, or Firm* — Sughrue Mion, PLLC

(57) ABSTRACT

A nanometer-size-particle production apparatus and method are provided which can prevent the occurrence of waste fluids, and which makes quick and continuous syntheses feasible while suppressing damages to the electrode. The
(Continued)

nanometer-size-particle production apparatus is for synthesizing nanometer size particles in a liquid by means of plasma in the liquid.

4 Claims, 12 Drawing Sheets

(51) Int. Cl.
    *C01G 9/02*     (2006.01)
    *H05H 1/46*     (2006.01)
    *B22F 9/14*     (2006.01)
    *B82Y 40/00*     (2011.01)
    *B82Y 30/00*     (2011.01)
    *B01J 19/08*     (2006.01)

(52) U.S. Cl.
    CPC .............. *B82Y 30/00* (2013.01); *B82Y 40/00* (2013.01); *C01F 5/14* (2013.01); *C01G 9/02* (2013.01); *H05H 1/46* (2013.01); *B01J 2219/082* (2013.01); *B01J 2219/089* (2013.01); *B01J 2219/0811* (2013.01); *B01J 2219/0841* (2013.01); *B01J 2219/0894* (2013.01); *B01J 2219/1233* (2013.01); *B01J 2219/1239* (2013.01); *B01J 2219/1269* (2013.01); *B22F 2999/00* (2013.01); *C01P 2002/72* (2013.01); *C01P 2002/84* (2013.01); *C01P 2004/03* (2013.01); *C01P 2004/24* (2013.01); *C01P 2004/64* (2013.01); *H05H 2001/463* (2013.01); *H05H 2001/4622* (2013.01); *H05H 2245/125* (2013.01)

(58) Field of Classification Search
    CPC .......... B01J 2219/0841; B01J 2219/089; B01J 2219/0894; B01J 2219/1233; B01J 2219/1239; B01J 2219/1269; B01J 2219/82; B22F 9/14; B22F 2999/00; B82Y 30/00; B82Y 40/00; C01F 5/14; C01G 9/02; H05H 1/46; H05H 2001/4622; H05H 2001/463; H05H 2245/125; H05H 1/28; C01P 2002/72; C01P 2002/84; C01P 2004/03; C01P 2004/24; C01P 2004/64; C23C 16/26; C23C 16/4485; C23C 16/509; H01J 37/32357

See application file for complete search history.

(56) References Cited

U.S. PATENT DOCUMENTS

2009/0109141 A1    4/2009    Murase et al.
2011/0229656 A1*   9/2011    Shibata .................. C23C 16/26
                                                                       427/577

FOREIGN PATENT DOCUMENTS

| JP | 2006-97038 A | 4/2006 |
| --- | --- | --- |
| JP | 2006-120636 A | 5/2006 |
| JP | 2008-13810 A | 1/2008 |
| JP | 2008-214174 A | 9/2008 |
| JP | 2009-506205 A | 2/2009 |
| JP | 2009-181960 A | 8/2009 |
| JP | 2010-121193 A | 6/2010 |
| WO | 2006/059808 A1 | 6/2006 |
| WO | WO2009/110625 * | 11/2009 |

OTHER PUBLICATIONS

Yoshiaki Hattori, et al., "Synthesis of zinc and zinc oxide nanoparticles from zinc electrode using plasma in liquid", Materials Letters, Jan. 31, 2011, pp. 188-190, vol. 65.

Communication dated Dec. 1, 2015 from the Japanese Patent Office in counterpart application No. 2013-511926.

* cited by examiner

| Power (W) | Feed Rate (mm/min) |
|---|---|
| 158 | 7.0 |
| 171 | 8.0 |
| 186 | 9.0 |

| Power (W) | Feed Rate (mm/min) |
|---|---|
| 133 | 4.3 |
| 161 | 6.6 |
| 200 | 9.3 |

| Power (W) | Feed Rate (mm/min) |
|---|---|
| 162 | 72 |
| 177 | 88 |

Fig. 13
| Power (W) | Feed Rate (mm/min) |
|---|---|
| 200 | 1.4 |
| 222 | 1.7 |
Fig. 14
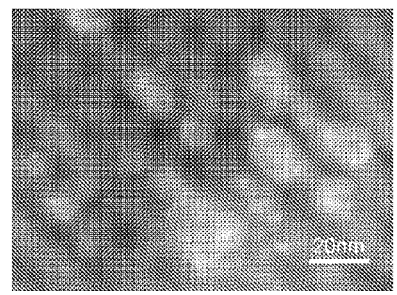
Fig. 15
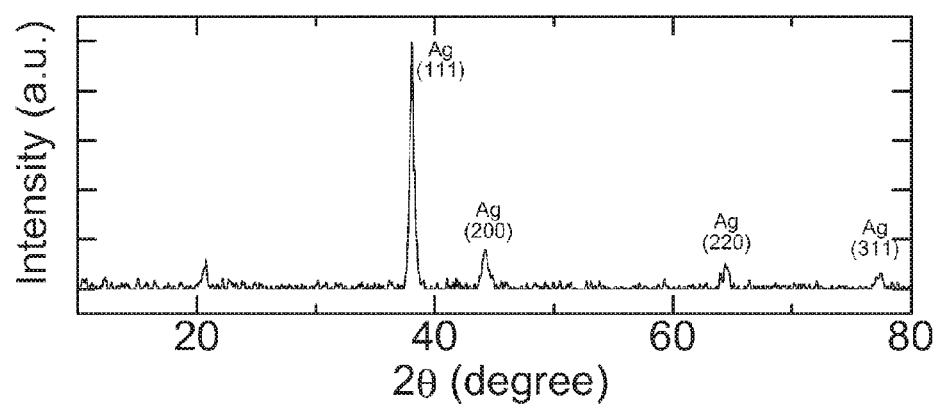

| Power (W) | Feed Rate (mm/min) |
|---|---|
| 150 | 6.2 |
| 200 | 11.1 |

NANOMETER-SIZE-PARTICLE PRODUCTION APPARATUS, NANOMETER-SIZE-PARTICLE PRODUCTION PROCESS, NANOMETER-SIZE PARTICLES, ZINC/ZINC OXIDE NANOMETER-SIZE PARTICLES, AND MAGNESIUM HYDROXIDE NANOMETER-SIZE PARTICLES

CROSS REFERENCE TO RELATED APPLICATIONS

This application is a Divisional of U.S. application Ser. No. 14/114,033, filed on Oct. 25, 2013, which is a National Stage of International Application No. PCT/JP2012/002799, filed on Apr. 24, 2012, which claims priority from Japanese Patent Application No. 2011-101531, filed on Apr. 28, 2011, the contents of all of which are incorporated herein by reference in their entirety.

TECHNICAL FIELD

The present invention is one which relates to nanometer-size particles, and to a production apparatus and production process for nanometer-size particles.

BACKGROUND ART

Since nanometer-size particles have physical properties that metallic chips do not have, the studies on nanometer-size particles have been advancing recently. Although a vapor-phase oxidation method has been available for the synthesis of nanometer-size particles, it is difficult to collect the resulting nanometer-size particles by this method. Hence, techniques for synthesizing nanometer-size particles utilizing plasma in liquid are set forth in Japanese Unexamined Patent Publication (KOKAI) Gazette No. 2008-13810 (i.e., Patent Literature No. 1) and Japanese Unexamined Patent Publication (KOKAI) Gazette No. 2010-121193 (i.e., Patent Literature No. 2), for instance.

RELATED TECHNICAL LITERATURE

Patent Literature

Patent Literature No. 1: Japanese Unexamined Patent Publication (KOKAI) Gazette No. 2008-13810; and
Patent Literature No. 2: Japanese Unexamined Patent Publication (KOKAI) Gazette No. 2010-121193

SUMMARY OF THE INVENTION

Assignment to be Solved by the Invention

However, waste fluids have arisen in the method like those aforementioned in which nanometer-size particles are synthesized while generating plasma in an ionic liquid including elements that make the raw materials of nanometer-size particles. Moreover, in the production of nanometer-size particles, it has been required to synthesize them quickly and continuously while suppressing damages to the electrode.
The present invention is one which has been done in view of such circumstances. Accordingly, it is an object to provide a nanometer-size-particle production apparatus and nanometer-size-particle production process which can prevent the occurrence of waste fluids, and which makes quick and continuous syntheses feasible while suppressing damages to the electrode. Moreover, it is another object to provide nanometer-size particles having a specific structure or configuration that have been produced by means of the present apparatus or present process.

Means for Solving the Assignment

The present invention is a nanometer-size-particle production apparatus for synthesizing nanometer-size particles in a liquid by means of plasma in liquid, and comprises:
  a container for accommodating said liquid therein;
  an electromagnetic-wave generation device for generating a high-frequency wave, or a microwave;
  an electrode conductor whose leading end makes contact with said liquid to supply said high-frequency wave or said microwave to said liquid;
  a covering portion being disposed into said liquid so as to cover a leading-end upside of said electrode conductor;
  a metallic chip being composed of a metal making a raw material of nanometer-size particles, and having a leading end that is disposed to face to the leading end of said electrode conductor; and
  a feed device for feeding out the leading end of said metallic chip with respect to the leading end of said electrode conductor;
  a leading-end section of said electrode conductor having a configuration that is a non-edge configuration; and
  said electrode conductor, except for the leading-end section, having an axially-orthogonal cross-sectional area that is larger than an axially-orthogonal cross-sectional area of said metallic chip.

In accordance with this constitution, plasma in liquid generates at the leading end of the metallic chip, not at the leading end of the electrode conductor that has a non-edge configuration, and thereby the metallic chip is damaged so that nanometer-size particles are being synthesized. Since the plasma is caused to generate at the leading end of the metallic chip, damages to the electrode conductor are suppressed. Moreover, since the metallic chip is fed out by means of the feed device to a position at which it faces to the leading end of the electrode conductor, it is possible to synthesize nanometer-size particles quickly and continuously. Moreover, since the metallic chip makes a raw material, it is not necessary to employ any acid, so that any liquids (such as alcohols), which do not turn into any waste fluids, will do. The "non-edge configuration" is a configuration that is free from any edge, and in which plasma is less likely to generate on that site; and can be, for example, convexed arc shapes, planar shapes, or configurations in which convexed arc shapes and planar shapes are combined, and the like.

In the present invention, it is preferable that the nanometer-size-particle production apparatus can comprise the electrode conductor having the leading-end section whose configuration is a convexed arc shape. This makes it possible to suppress the generation of plasma at the leading end of the electrode conductor, and thereby it is possible to facilitate the generation of plasma at the leading end of the metallic chip, so that it is possible to suppress damages to the electrode conductor more securely.

Moreover, in the present invention, it is preferable that the nanometer-size-particle production apparatus can comprise an electrode having: an inner conductor; a dielectric being disposed on an outer circumference of said inner conductor; and an outer conductor being disposed on an outer circumference of said dielectric; that a leading end of said inner conductor, a leading end of said dielectric, and a leading end of said outer conductor can be disposed on an identical plane; and that said electrode conductor can be said inner conductor. Making the electrode conductor of the aforementioned electrode's inner conductor leads to making it possible to supply a high-frequency wave or microwave into the liquid more securely. Moreover, putting the leading ends of the respective constituent elements of the electrode at positions equally on an identical plane all together results in disposing the rim of the inner conductor's leading end (e.g., a convexed-arc-shaped section) on a more inner side than is the dielectric's leading end, so that it is possible to prevent plasma from generating at a contact part between the inner conductor and the dielectric. This makes it feasible to prevent damages to the electrode (to the dielectric, especially).

In the present invention, it is preferable that the nanometer-size-particle production apparatus can comprise said inner conductor having a melting point that is greater than a melting point of said metallic chip. This makes it possible to cause plasma to generate at the leading end of the metallic chip more securely.

Moreover, in the present invention, it is preferable that the nanometer-size-particle production apparatus can further comprise a liquid circulation device for not only supplying said liquid into said container but also discharging said liquid from within said container. This makes it possible to circulate the liquid continuously, so that it becomes feasible to synthesize nanometer-size particles more continuously.

Moreover, it is possible to set forth the present invention as a nanometer-size-particle production process. That is, the present invention is a nanometer-size-particle production process for synthesizing nanometer-size particles into a liquid by means of plasma in liquid; and includes:
- a disposition step of face-to-face disposing, within said liquid, a metallic chip above the leading-end upside of an electrode conductor in which a covering portion is disposed;
- a supply step of supplying a high-frequency wave, or a microwave, into said liquid by way of said electrode conductor; and
- a feed step of feeding out said metallic chip toward said electrode conductor;
- a leading-end section of said electrode conductor having a configuration that is a non-edge configuration; and
- said electrode conductor, except for the leading-end section, having an axially-orthogonal cross-sectional area that is larger than an axially-orthogonal cross-sectional area of said metallic chip.

This causes the same advantageous effects as those aforementioned to demonstrate.

Note herein that said liquid being pure water, and said metallic chip being formed of magnesium make it possible to produce nanometer-size particles comprising: zinc nanometer-size particles; and zinc oxide nanometer-size particles being disposed so as to surround a periphery of said zinc nanometer-size particles.

Moreover, said liquid being pure water, and said metallic chip being formed of magnesium makes it possible to produce magnesium hydroxide nanometer-size particles having a plate shape, and being formed as a hexagon, or a triangle.

In accordance with the present invention, quick and continuous syntheses become feasible while suppressing damages to electrodes, without ever letting any waste fluids out. The present process makes it possible to produce nanometer-size particles having a specific structure or configuration.

BRIEF DESCRIPTION OF THE DRAWINGS

FIG. 13 a diagram for illustrating powers and feed rates in Embodiment No. 4;

FIG. 14 is a diagram (namely, a photograph) for illustrating the results of an observation on the post-synthesis liquid in Embodiment No. 4 by an electron microscope;

FIG. 15 is a graph for illustrating the results of an analysis by means of XRD in Embodiment No. 4;

MODE FOR CARRYING OUT THE INVENTION

Next, while giving preferred embodiment modes, the present invention will be explained in more detail.

First Embodiment Mode

Figure 1:
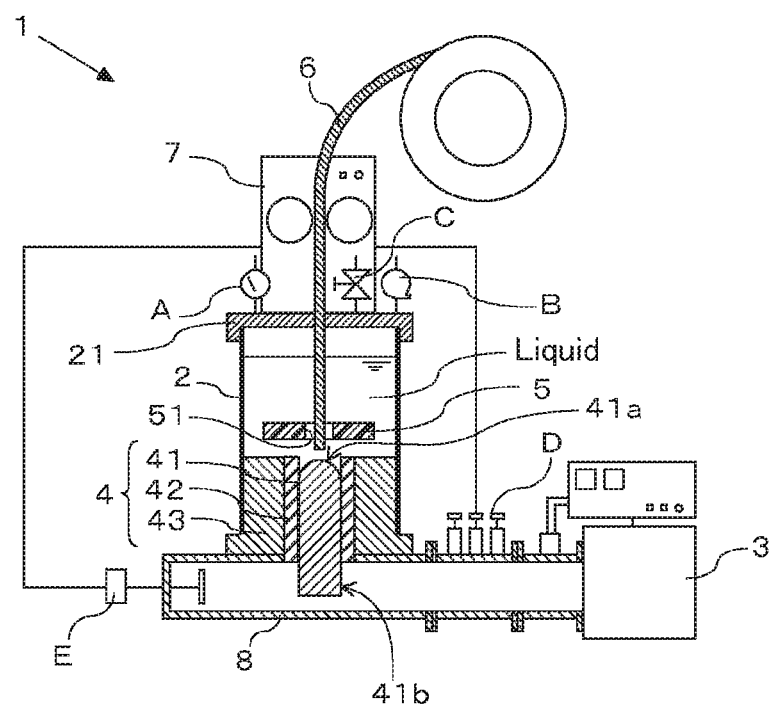
FIG. 1 is a schematic diagram for illustrating the constitution of a nanometer-size-particle production apparatus 1 according to a First Embodiment Mode.

As illustrated in FIG. 1, a nanometer-size production apparatus 1 according to a First Embodiment Mode is mainly equipped with a container 2, a microwave generation device 3, an electrode 4, a plate 5, a metallic wire 6, a feed device 7, and a waveguide 8.

The container 2 is one which is capable of accommodating a liquid therein, and accommodates a liquid, such as alcohol or pure water, in the interior. In the First Embodiment Mode, the container 2 is sealed, because the top is plugged with a lid 21 and the bottom is plugged with a leading-end section of the electrode 4.

The microwave generation device 3 is a device for generating microwaves. In the First Embodiment Mode, a microwave whose frequency is about 2.45 GHz is generated by means of a magnetron. The microwave is sent to the electrode 4 by way of the waveguide 8, and is then supplied into the liquid from the leading end of the electrode 4.

The electrode 4 comprises an inner conductor 41, a dielectric 42 being disposed on an outer circumference of the inner electrode 41, and an outer conductor 43 being disposed on an outer circumference of the dielectric 42; and is an electrode in which each of the constituent elements is formed in a coaxial manner. The leading-end section of the electrode 4 plugs the lower opening of the container 2, thereby constituting the bottom of the container 2. In other words, the leading-end section of the electrode 4 makes contact with the liquid inside the container 2.

The inner conductor 41 (being equivalent to the "electrode conductor") is a cylindrical conductor, and is formed of copper in the First Embodiment Mode. A leading-end section 41a of the inner conductor 41 is formed as a non-edge configuration (or an edge-free configuration) that does not have any corners. To be concrete, the leading-end section 41a of the inner conductor 41 has a configuration (or a leading-end configuration) being formed as a convexed arc shape that protrudes with a gentle curved surface. The leading-end section 41a makes contact with the liquid inside the container 2. The inner conductor 4, except for the leading-end section 41a (or a convexed-arc-shaped part), has a diameter of about 10 mm. A trailing-end section 41b of the inner conductor 41 is inserted into the waveguide 8.

The dielectric 42 is cylindrical, and is disposed on an outer circumference of the inner conductor 41 in a coaxial manner. The dielectric 42 is formed of polytetrafluoroethylene. An inner-circumferential face of the dielectric 42 makes contact with an outer-circumferential face of the inner conductor 41. Note herein that the rim of the leading-end section 41a of the inner conductor 41 is positioned nearer toward the trailing-end side of the dielectric 42 than is the leading end of the dielectric 42. In other words, the rim in the leading end of the inner conductor 41 is positioned on a more inner side than is the leading end of the dielectric 42. The "rim in the leading-end section 41a" is an outer-circumferential fraction of a part in the leading-end section 41a that makes the maximum diameter in the axially-orthogonal cross section of the leading-end section 41a.

The outer conductor 43 is a cylindrical conductor, and is disposed on an outer circumference of the dielectric 42 in a coaxial manner. The outer conductor 43 is formed of copper. An inner-circumferential face of the outer conductor 43 makes contact with an outer-circumferential face of the dielectric 42. Note that a material of the outer conductor 43 can be any material in which electricity is likely to flow, because it does not affect the field for synthesizing nanometer-size particles. The electrode 4 according to the present embodiment mode is formed so that the leading end of the inner conductor 41 (or its leading-end position of the leading-end section 41a), the leading end of the dielectric 42 (or its leading-end face), and the leading end of the outer conductor 43 (or its leading-end face) are positioned on an identical plane. In other words, the leading-end position of each of the constituent elements in the electrode 4 is arranged uniformly or held equally at an identical height substantially. Note that the phrase, "being positioned on an identical plane," involves "being positioned on an identical plane substantially," because some errors are permissible therein.

The plate 5 (being equivalent to the "covering portion") is a flat-plate-shaped member, and is disposed into the liquid inside the container 2 so as to cover the central upside in the leading end of the electrode 4 (i.e., a part of the inner conductor 41, dielectric 42 and outer conductor 43). To put it differently, the plate 5 is disposed to face to the leading end of the electrode 4. The plate 5 is disposed to separate away from the leading end of the electrode 4 by from 3 to 5 mm. The plate 5 is fixed to the outer conductor 43 partially by means of fastening members, such as screws. At a part of the plate 5 that faces to the inner conductor 41, a through hole 51 for letting a later-described metallic wire 6 go through is formed. A lower face of the plate 5 can have a configuration that is capable of temporarily retaining bubbles therein.

The metallic wire 6 (being equivalent to the "metallic chip") is formed of a metal, namely, a raw material of nanometer-size particles. A leading end of the metallic wire 6 is disposed to face to the leading end of the inner conductor 41. A separation distance ("x") between the leading end of the metallic wire 6 and the leading end of the inner conductor 41 can be 2 mm or less (i.e., $0<"x"\leq 2$ mm), and is from about 1 to 2 mm in the First Embodiment Mode. That is, the leading end of the metallic wire 6 is disposed to be separated away from and be in proximity with respect to the leading end of the inner conductor 41. However, even in a case where the leading end of the metallic wire 6 makes contact with the leading end of the inner conductor 41 (i.e., "x"=0), plasma generates at around a leading-end section of the metallic wire 6 itself, so that the advantageous effects of the present invention can be demonstrated when a melting point of the inner conductor 4 is higher than a melting point of the metallic wire 6. A diameter of the metallic wire 6 is about 2 mm approximately. That is, an axially-orthogonal cross-sectional area of the metallic wire 6 is smaller than an axially-orthogonal cross-sectional area of the inner conductor 41 (except for the leading-end section 41a). The metallic wire 6 is wound around a drum, and the like, on the trailing-end side (i.e., on the upper side in FIG. 1). The term, "axially-orthogonal cross section," means a cross section of the constituent elements upon cutting them in a direction that crosses the axial direction (or the longitudinal direction) perpendicularly.

The feed device 7 is one which has been known publicly, and is a device for feeding out the metallic wire 6 with respect to the inner conductor 41. The feed device 7 pinches the metallic wire 6 between the two rolls, and then rotates the rolls to feed the metallic wire 6 downward. In the First Embodiment Mode, a feed rate of the feed device 7 is set up depending on a power for causing plasma to generate.

The waveguide 8 is one for conducting the microwave, which has generated at the microwave generation device 3, to the electrode 4. With one of the opposite end sides of the waveguide 3, the electrode 4 is connected; whereas, with the other one of the opposite end sides, the microwave generation device 3 is connected. Since the waveguide 8 is one which has been known publicly, the detailed explanations will be abbreviated herein.

In addition to those above, the nanometer-size-particle production apparatus 1 is further equipped with a pressure gauge "A," a vacuum pump "B," a pressure adjustment valve "C," a stub tuner "D," and a plunger "E," and so on. Using the pressure gauge "A," vacuum pump "B" and pressure adjustment valve "C" makes it possible to adjust a pressure inside the container 2. By means of the stub tuner "D" and plunger "E," matching operations are carried out; moreover, by means of a not-shown coaxial waveguide converter, it is possible to make adjustments so as to make it possible to supply energy from the microwave generation device 3 to the reaction field efficiently. The microwave is transmitted through a coaxial cable line in a TEM mode.

Explanations will be made hereinafter on operations and advantageous effects of the First Embodiment Mode. First of all, the microwave generation device 3 causes the microwave to generate. The microwave conducts through the waveguide 8, and is eventually transmitted to the electrode 4 (i.e., the inner conductor 41). The microwave is given from the leading-end section 41a of the inner conductor 41 to the liquid inside the container 2. Then, plasma in liquid generates, not at around the leading end of the inner conductor 41, but at around the leading end of the metallic wire 6 whose diameter is smaller than that of the inner conductor 41. Since the leading end of the inner conductor 41 has a configuration being formed as a convexed arc shape that is free from edges entirely, plasma becomes less likely to generate at the leading end of inner conductor 41. Thus, plasma generates at the leading end of the metallic wire 6, namely, a raw material, and thereby the leading end of the inner conductor 41 can be protected from being damaged by means of the resulting plasma. Since the resultant plasma is a high temperature, bubbles generate simultaneously with the generation of the plasma.

The bubbles, which have been generated by means of the plasma into the liquid, are kept from rising by means of the plate 5, and are thereby retained between the plate 5 and the electrode 4, so that the bubbles always fill up between them during syntheses. The metallic wire 6 (i.e., a material of nanometer-size particles), which has been vaporized by means of the plasma during this time, condenses, and thereby nanometer-size particles are synthesized. A gas-temperature rise is brought about by means of retaining the bubbles between the plate 5 and the electrode 4, thereby making high-rate syntheses of nanometer-size particles feasible. Although the leading end of the metallic wire 6 is being damaged by the vaporization resulting from the plasma, it is fed out to the predetermined face-to-face position successively by means of the feed device 7. In other words, a nanometer-size-particle workpiece is supplied continuously to a position at which it faces to the leading end of the inner conductor 41. Thus, in accordance with the First Embodiment Mode, it is possible to quickly and continuously synthesize nanometer-size particles into liquids.

Figure 2:
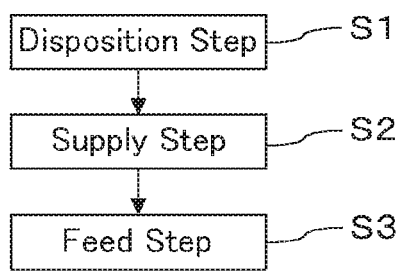
FIG. 2 is a flow diagram for illustrating steps according to the First Embodiment Mode.

As illustrated in FIG. 2, a nanometer-size-p article production process according to the First Embodiment Mode comprises: a disposition step (i.e., Step "S1") of face-to-face disposing, within the liquid, the leading end of the metallic wire 6 with respect to an electrode conductor in which the plate 5 is disposed above the leading-end upside; a supply step (i.e., Step "S2") of supplying the microwave (or energy resulting from the microwave) into the liquid by way of the inner conductor 41; and a feed step (i.e., Step "S3") of feeding out the leading end of the metallic wire 6 toward the inner conductor 41. And, the inner conductor 41, except for the leading-end section 41a, has an axially-orthogonal cross-sectional area that is larger than an axial-orthogonal cross-sectional area of the metallic wire 6; and the leading end of the inner conductor 41 has a configuration that makes a convexed arc shape. In the feed step (i.e., Step "S3"), the metallic wire 6 can be fed out by means of electric power or manual operations in compliance with damages to the leading end of the metallic wire 6.

Embodiment No. 1

Figures 3, 4:
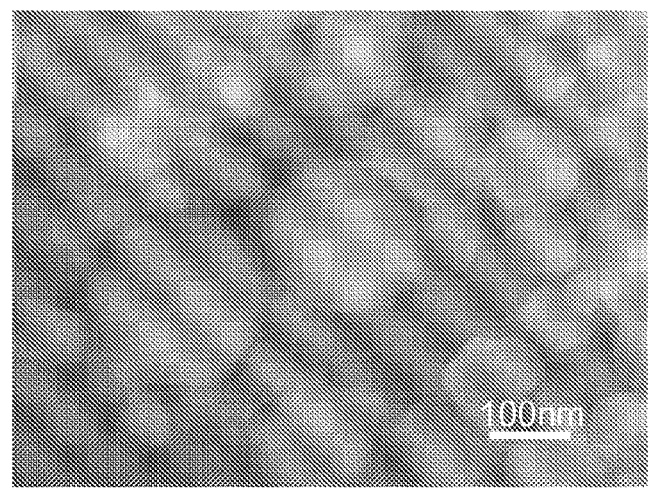
FIG. 3 is a diagram for illustrating powers and feed rates in Embodiment No. 1.
FIG. 4 is a diagram (namely, a photograph) for illustrating the results of an observation on the post-synthesis liquid in Embodiment No. 1 by an electron microscope.

Explanations will be made on Embodiment No. 1 in which nanometer-size particles were synthesized using the present apparatus (or the present process). As the metallic wire 6, zinc with 2 mm in diameter was used. As for the liquid, ethanol was used in an amount of 100 mL. A pressure inside the container 2 (or a container inner pressure) was set at 20 kPa. Plasma was caused to generate into the liquid by a microwave whose frequency was 2.45 GHz. A feed rate of the feed device 7 was set up in compliance with powers upon causing the plasma to generate. To be concrete, the feed rate was set at 7 mm/minute with respect to a power of 158 W; the feed rate was set at 8 mm/minute with respect to a power of 171 W; and the feed rate was set at 9 mm/minute with respect to a power of 186 W, as shown in FIG. 3.

Figures 5, 6:
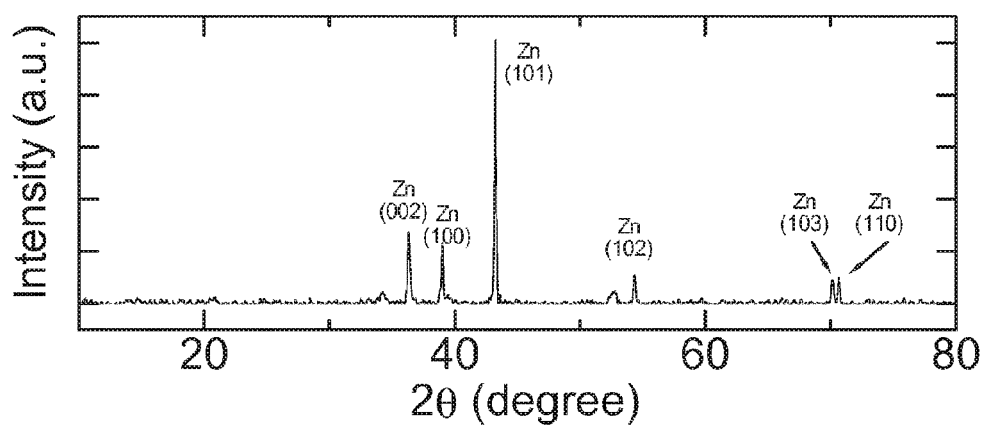
FIG. 5 is a graph for illustrating the results of an analysis by means of XRD in Embodiment No. 1.
FIG. 6 is a diagram for illustrating powers and feed rates in Embodiment No. 2.

By means of those above, nanometer-size particles having about 10 nm approximately were synthesized. The results (or a photograph) of observing the post-synthesis liquid (i.e., the synthesized particles) by an electron microscope are shown in FIG. 4. This photograph is the one in which the nanometer-size particles were synthesized by 186 W. According to the results of an analysis by means of XRD, it became apparent that zinc nanometer-size particles were synthesized, as shown in FIG. 5. The vertical axis in FIG. 5 (i.e., the results of an analysis by means of XRD) specifies the diffraction intensities; whereas the horizontal axis in FIG. 5 specifies the incident angles. The synthesis rate was from about 10 to 12 grams per hour.

Embodiment No. 2

Explanations will be made on Embodiment No. 2 in which nanometer-size particles were synthesized using the present apparatus (or the present process). As the metallic wire 6, zinc with 2 mm in diameter was used. As for the liquid, pure water was used in an amount of 100 mL. A container inner pressure was set at 20 kPa. Plasma was caused to generate into the liquid by a microwave whose frequency was 2.45 GHz. A feed rate of the feed device 7 was set up in compliance with powers upon causing the plasma to generate. To be concrete, the feed rate was set at 4.3 mm/minute with respect to a power of 133 W; the feed rate was set at 6.6 mm/minute with respect to a power of 161 W; and the feed rate was set at 9.3 mm/minute with respect to a power of 200 W, as shown in FIG. 6.

Figure 7:
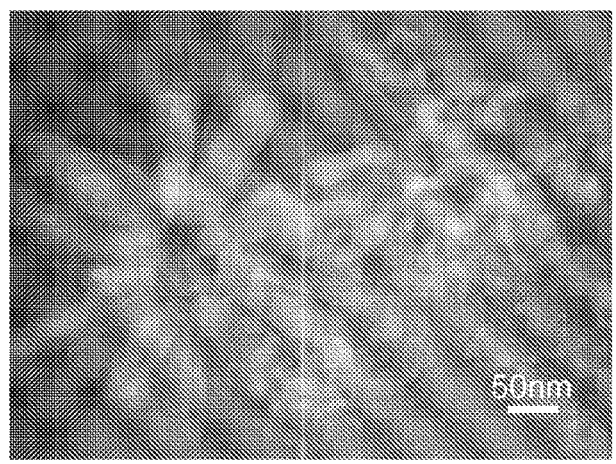
FIG. 7 is a diagram (namely, a photograph) for illustrating the results of a 50-nm-level observation on the post-synthesis liquid in Embodiment No. 2 by an electron microscope.
Figure 8:
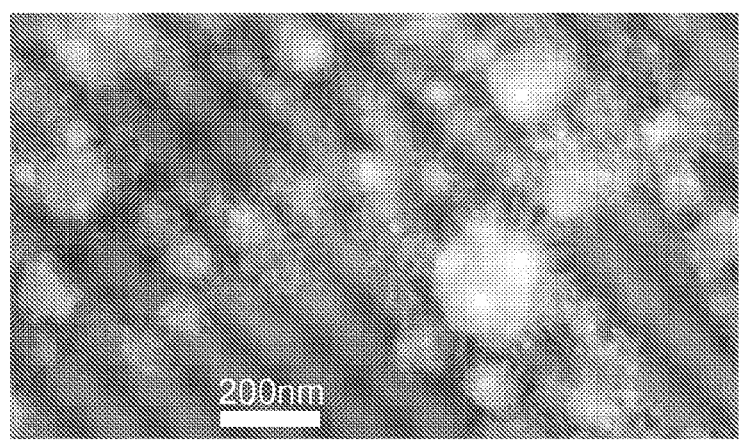
FIG. 8 is a diagram (namely, a photograph) for illustrating the results of a 200-nm-level observation on the post-synthesis liquid in Embodiment No. 2 by an electron microscope.
Figures 9, 10:
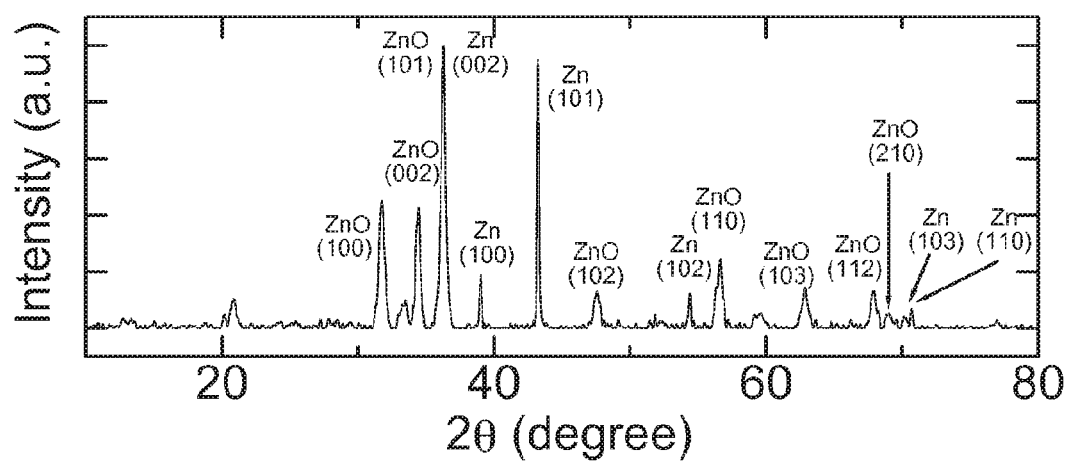
FIG. 9 is a graph for illustrating the results of an analysis by means of XRD in Embodiment No. 2.
FIG. 10 a diagram for illustrating powers and feed rates in Embodiment No. 3.

By means of those above, one including sharp-tipped nanometer-size particles having about 100 nm approximately was synthesized. The results (or photographs) of observing the post-synthesis liquid (i.e., the synthesized particles) by an electron microscope are shown in FIG. 7 and FIG. 8. These photographs are the one in which the nanometer-size particles were synthesized by a power of 133 W, respectively. According to the results of an analysis by means of XRD, it became apparent that zinc and zinc oxide nanometer-size particles were synthesized, as shown in FIG. 9. The zinc oxide nanometer-size particles were those whose tips were pointed, as shown in FIG. 7; whereas the zinc nanometer-size particles were formed as a hexagon or circle, as shown in FIG. 8. In other words, nanometer-size particles, which had been produced by this process, included nanometer-size particles having such a structure that the zinc oxide nanometer-size particles surrounded around the periphery of the zinc nanometer-size particles as shown in FIG. 8. Taking the fact that some of them had oxidized, the synthesis rate was about 14 grams per hour.

Embodiment No. 3

Explanations will be made on Embodiment No. 3 in which nanometer-size particles were synthesized using the present apparatus (or the present process). As the metallic wire 6, magnesium with 1.6 mm in diameter was used. As for the liquid, pure water was used in an amount of 100 mL. A container inner pressure was set at 20 kPa. Plasma was caused to generate into the liquid by a microwave whose frequency was 2.45 GHz. A feed rate of the feed device 7 was set up in compliance with powers upon causing the plasma to generate. To be concrete, the feed rate was set at 72 mm/minute with respect to a power of 162 W; and the feed rate was set at 88 mm/minute with respect to a power of 177 W, as shown in FIG. 10.

Figure 11:
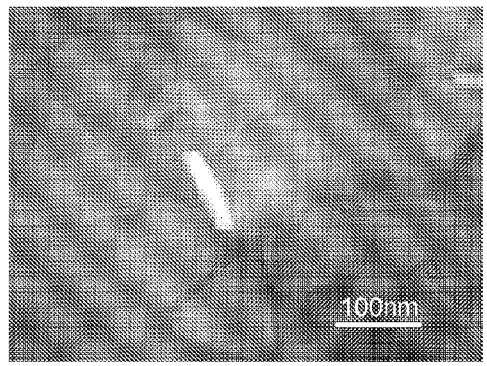
FIG. 11 is a diagram (namely, a photograph) for illustrating the results of an observation on the post-synthesis liquid in Embodiment No. 3 by an electron microscope.
Figure 12:
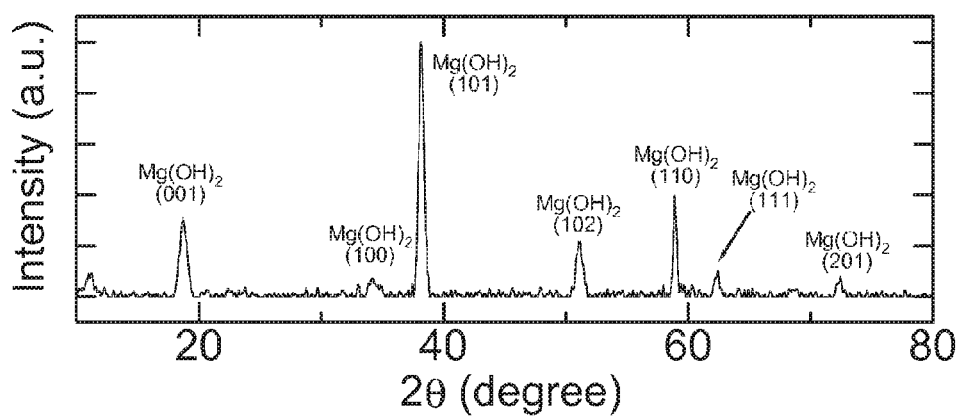
FIG. 12 is a graph for illustrating the results of an analysis by means of XRD in Embodiment No. 3.

By means of those above, hexagonal (including truncated-triangular ones) or triangular nanometer-size particles having about 100 nm approximately were synthesized. The results (or a photograph) of observing the post-synthesis liquid (i.e., the synthesized particles) by an electron microscope are shown in FIG. 11. This photograph is the one in which the nanometer-size particles were synthesized by a power of 162 W. According to the results of an analysis by means of XRD, it became apparent that magnesium hydroxide nanometer-size particles were synthesized, as shown in FIG. 12. The synthesis rate was about 60 grams per hour.

Embodiment No. 4

Explanations will be made on Embodiment No. 4 in which nanometer-size particles were synthesized using the present apparatus (or the present process). As the metallic wire 6, silver with 1 mm in diameter was used. As for the liquid, pure water was used in an amount of 100 mL. A container inner pressure was set at 20 kPa. Plasma was caused to generate into the liquid by a microwave whose frequency was 2.45 GHz. A feed rate of the feed device 7 was set up in compliance with powers upon causing the plasma to generate. To be concrete, the feed rate was set at 1.4 mm/minute with respect to a power of 200 W; and the feed rate was set at 1.7 mm/minute with respect to a power of 222 W, as shown in FIG. 13.

By means of those above, nanometer-size particles having about 20 nm approximately were synthesized. The results (or a photograph) of observing the post-synthesis liquid (i.e., the synthesized particles) by an electron microscope are shown in FIG. 14. This photograph is the one in which the nanometer-size particles were synthesized by a power of 222 W. According to the results of an analysis by means of XRD, it became apparent that silver nanometer-size particles were synthesized, as shown in FIG. 15. The synthesis rate was about 0.8 grams per hour.

Embodiment No. 5

Figures 16, 17:
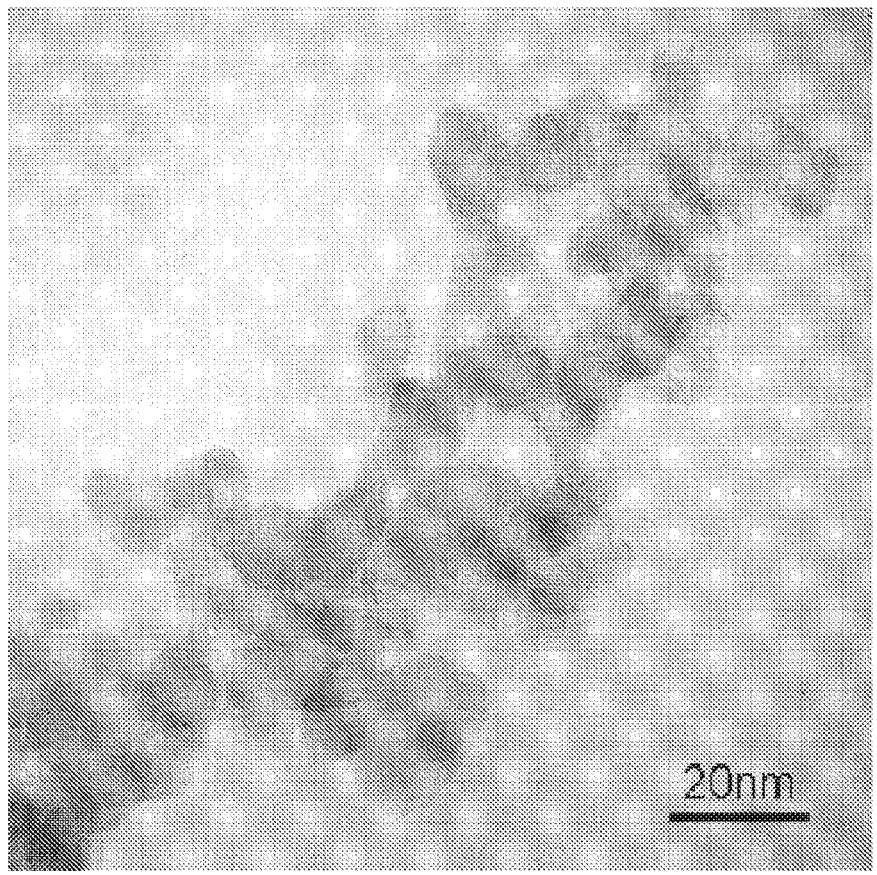
FIG. 16 is a diagram for illustrating powers and feed rates in Embodiment No. 5.
FIG. 17 is a diagram (namely, a photograph) for illustrating the results of an observation on the post-synthesis liquid according to Embodiment No. 5 by an electron microscope in a case where a container inner pressure was 20 kPa.

Explanations will be made on Embodiment No. 5 in which nanometer-size particles were synthesized using the present apparatus (or the present process). As the metallic wire 6, tungsten with 1 mm in diameter was used. As for the liquid, pure water was used in an amount of 100 mL. With regard to the container inner pressure, the synthesis was carried out in each of the following cases: when it was set at 20 kPa; and when it was set at 101 kPa. Plasma was caused to generate into the liquid by a microwave whose frequency was 2.45 GHz. A feed rate of the feed device 7 was set up in compliance with powers upon causing the plasma to generate. To be concrete, regardless of the container inner pressures, the feed rate was set at 6.2 mm/minute with respect to a power of 150 W; and the feed rate was set at 11.1 mm/minute with respect to a power of 200 W, as shown in FIG. 16.

Figure 18:
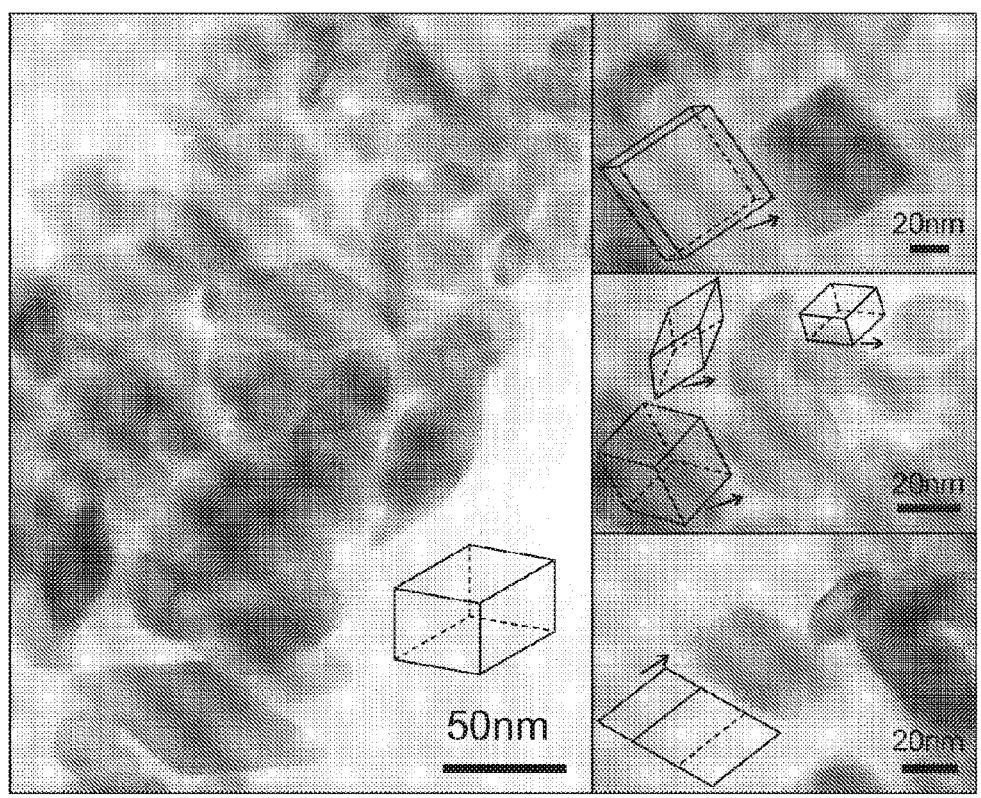
FIG. 18 is a diagram (namely, a photograph) for illustrating the results of an observation on the post-synthesis liquid according to Embodiment No. 5 by an electron microscope in a case where a container inner pressure was 101 kPa.

As a consequence of the synthesis, nanometer-size particles having 30 nm or less in diameter were synthesized even at any of the container inner pressures (i.e., 20 kPa, and 101 kPa). The post-synthesis liquid (i.e., the synthesized particles), which had undergone the synthesis by a power of 200 W at each of the container inner pressures, was analyzed by means of an electron microscope, XRD, and an absorption spectrophotometer. The results (or photographs) of the observation by an electron microscope are shown in FIG. 17 and FIG. 18, respectively. Moreover, the distributions of particle diameters of the synthesized particles are in shown FIG. 19.

Figure 19:
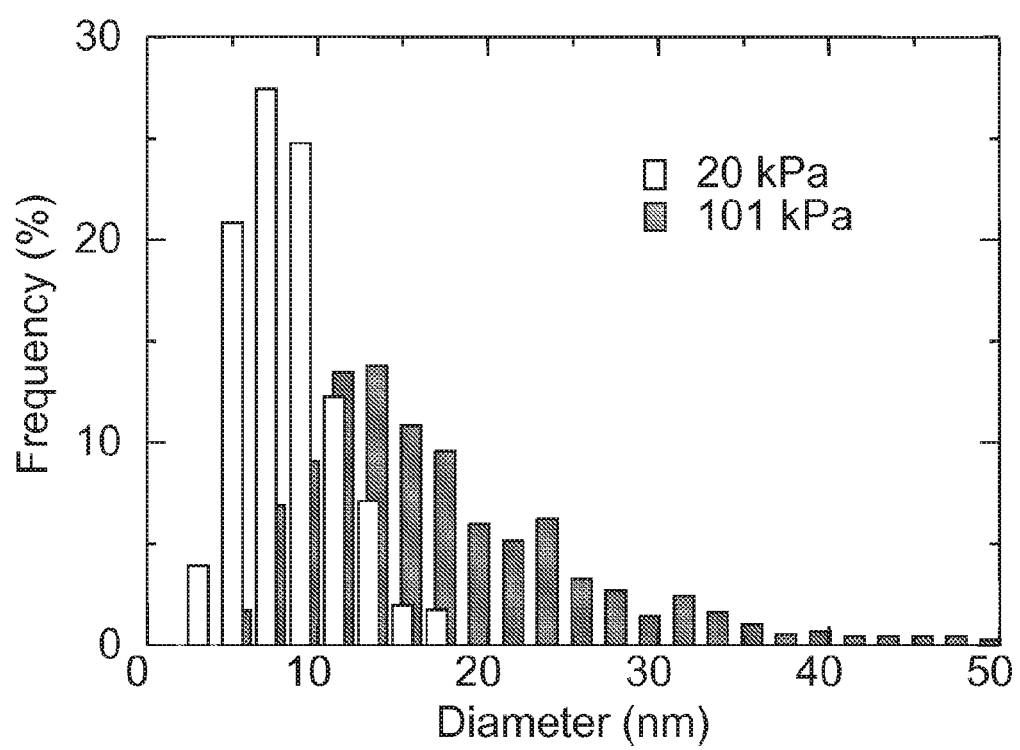
FIG. 19 is a graph for illustrating distributions of particle diameters of synthesized particles in Embodiment No. 5.

As illustrated in FIG. 19, a large number of single-crystalline particles, which were formed as a sphere with 8 nm approximately in diameter, were observed in the nanometer-size particles that were synthesized under 20 kPa. Meanwhile, in another case where the synthesis was done under 101 kPa, sphere-shaped nanometer-size particles with 14 nm in diameter were observed most abundantly. In addition to those, quadrangular or diamond-shaped particles with such a large size as 50 nm were also ascertained, as shown in FIG. 18. When analyzing the configurations of the resulting particles, it is believed that the large-sized particles appeared a diamond or rectangle depending on the viewing angle, because they were diamond-shaped polygonal columns. The vertical axis in FIG. 19 specifies the frequencies; whereas the horizontal axis in FIG. 19 specifies the diameters.

Figure 20:
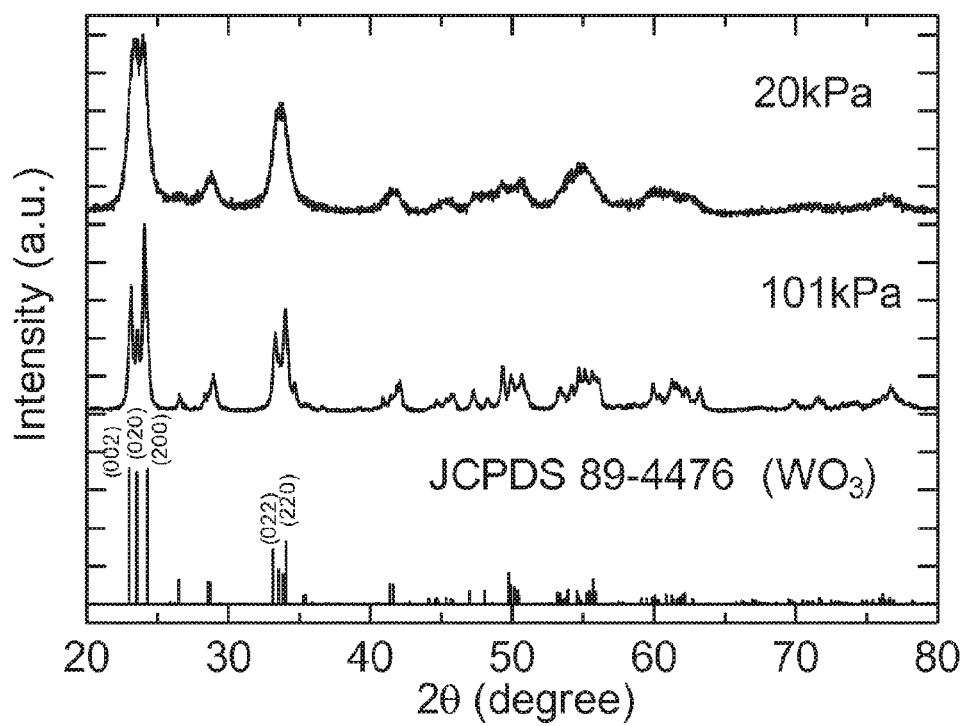
FIG. 20 is a graph for illustrating the results of an analysis by means of XRD in Embodiment No. 5.
Figure 21:
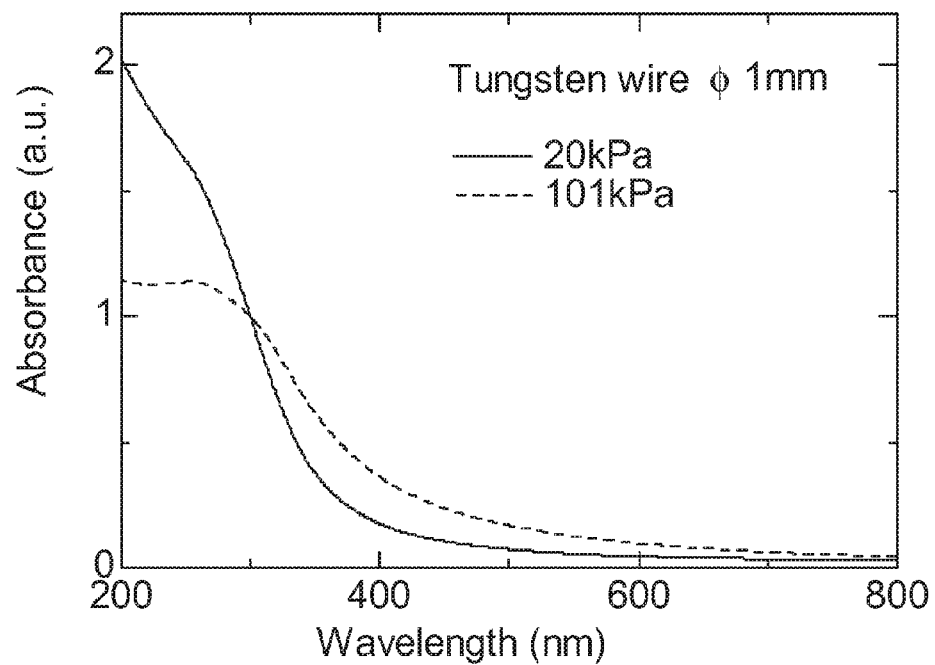
FIG. 21 is a graph for illustrating the results of an analysis by means of an absorption spectrophotometer in Embodiment No. 5.

The results of the analysis by means of XRD are shown in FIG. 20. As illustrated in FIG. 20, the synthesized particles were identified to be tungsten trioxide nanometer-size particles even at any of the container inner pressures. Moreover, the post-synthesis liquid had a color that changed depending on the container inner pressures during the synthesis. In a case where the synthesis was done at 20 kPa, the post-experiment solution was colored in a dark blue; whereas, in another case where the synthesis was done at 101 kPa, it turned into a solution having a whitish blue color. The results of the analysis by means of an absorption spectrophotometer are shown in FIG. 21. As illustrated in FIG. 21, it was ascertained that the physical property of nanometer-size particles to be synthesized changes depending on differences in the container inner pressures. The vertical axis in FIG. 21 specifies the absorbances; whereas the horizontal axis in FIG. 21 specifies the wavelengths. When the synthesis was done by a power of 200 W, the synthesis rate was, regardless of the container inner pressures, about 10 grams per hour.

If the inner conductor 41 should have been damaged so that the inner conductor 41 should have shortened, it should become impossible to do the continuous synthesis because no plasma should generate. In Embodiment Nos. 1 through 5, since it was possible to synthesize the nanometer-size particles continuously, and since the metallic wire 6 had shortened, it is understood that the plasma generated at the leading end of the metallic wire 6. Moreover, the spectrum of the conductor 41 was not detected at all even in the results of the analysis by means of XRD, it is also understood that the conductor 41 were kept from being damaged. In the First Embodiment Mode, since all of the metallic wire 6 turned into particles to the extent that it had been supplied, high synthesis rates could be achieved.

As described so far, in accordance with the First Embodiment Mode, it is possible to synthesize nanometer-size particles quickly and continuously while suppressing damages to the inner conductor 41. Moreover, since it is not necessary to use an acid as the liquid, it is possible to use alcohols and water that do not turn into any waste fluids. In other words, it is possible to prevent the occurrence of waste fluids.

Modified Embodiments

The present invention is not limited at all to the aforementioned embodiment modes. For example, the feed device 7 is not limited at all to those which feed out the metallic wire 6 automatically. The feed device 7 can be those which are capable of retaining the metallic wire 6 so as to make the leading-end position adjustable with respect to the inner conductor 41. Feeding (or moving) the metallic wire 6 can also be done manually.

Moreover, a configuration that the inner conductor 41 has at the leading end can be a planar shape, too. In this case, it is preferable that the leading ends of the electrode 4 can be flush (or in a flat state) with each other. The "convexed arc shape" can be curved surfaces, like a part of spherical surfaces, for instance. Moreover, it is also allowable that the leading end of the inner conductor 41 can have a planar shape at the central section as well as a convexed arc shape at the rim therearound. For example, it is even permissible that the leading end of the inner conductor 41 can be those which have been chamfered so as to make smooth edges around the rim. These configurations are a configuration, which inhibits plasma from generating at the leading end of the inner conductor 41 but which causes plasma to generate at the leading end of the metallic wire 6, respectively. The leading end of the inner conductor cannot necessarily have a configuration that makes a pointed configuration, but can have configurations that make plasma less likely to generate.

Moreover, it is preferable that the inner conductor 41, except for the leading-end section 41a, can have a diameter of 6 mm or more; practically, however, being from to 15 mm is preferable. In contrast to this, it is preferable that the metallic chip can have from 1 to 3 mm. It is preferable that a ratio of the diameter of the metallic wire 6 to the diameter of the inner conductor 41 can make ½ or less; furthermore, being ⅕ or less is preferable.

Moreover, it is also allowable that the electrode 4 can be disposed on a side face of the container 2. In other words, the side face of the container 2 makes contact with the liquid laterally at the leading end of the electrode 4 thereon. In this case, the plate 5 is disposed on that side face of the container 2, and covers the leading-end upside of the inner conductor 41. It is also allowable that metallic wire 6 can be supplied toward the downside through the through hole of the plate 5 in the same manner as the aforementioned embodiment mode. Alternatively, it is even permissible that the metallic wire 6 can be supplied laterally from another side face that faces to the side face on which the electrode 4 is disposed.

Moreover, a frequency of the microwave can be selected suitably in accord with a liquid to be employed and an intended use or purpose for the resulting plasma; and can be from 100 MHz to 200 GHz approximately. However, utilizing a magnetron whose frequency is 2.45 GHz enables common microwave ovens to be used as a microwave generation device, so that it is possible to keep down the manufacturing costs. Moreover, although it is preferable that the leading-end rim of the inner conductor 41 can be positioned on a more trailing-end side of the dielectric 42 than is the leading end of dielectric 42, it is also allowable that the leading-end positions of the respective constituent elements of the electrode 4 cannot necessarily be made equal to each other. However, when the leading-end section 41a is formed in a convexed arc shape as done in the present embodiment mode, positioning the leading ends of the respective constituent elements of the electrode 4 on an identical plane leads to making it possible to dispose the rim of the leading-end section 41a securely on a more inner side (or trailing-end side) than is the leading end of the dielectric 42. Disposing the rim of the leading-end section 41a of the inner conductor 41 on a more inner side than is the leading end of the dielectric 42 results in making it possible to prevent plasma from generating at the contact part between the inner conductor 41 and the dielectric 42. This makes it feasible to prevent the electrode 4 (or the dielectric 42, especially) from being damaged. Moreover, disposing the leading-end positions of the respective constituent elements of the electrode 4 on an identical plane leads to striking a balance between the following; protecting the leading end of the inner conductor 41; and making plasma likely to generate.

Moreover, it is also advisable that the feed device 7 can be electrically connected to the stub tuner "D," and to the plunger "E" (see the solid lines in FIG. 1). And, in this case, it is preferable that the stub tuner "D," and the plunger "E" can be subjected to matching automatically, regarding the supply of energy resulting from the microwave, so that they become optimum for a feed rate of the metallic wire 6. Interlocking the feed device 7, the stub tuner "D," and the plunger "E" with each other (or causing them to do feedback one another) results in making the following feasible: setting up an appropriate feed rate, and an appropriate power; and automatizing their appropriate adjustments.

Moreover, it is allowable to even use a high-frequency-wave generation device (not shown), instead of the microwave generation device 3. In the present invention, a "high-frequency wave" means electromagnetic waves whose frequency is from 1 MHz to 100 MHz. These can also generate plasma in liquid, so that the same advantageous effects as those aforementioned can be demonstrated.

Moreover, the electrode 4 is not limited at all to coaxially-shaped ones, but it is allowable that the electrode 4 can even be an antenna electrode (not shown) comprising rod-shaped conductors. In particular, in the case of a high-frequency wave, it is possible to cause plasma in liquid to readily generate, without ever using any coaxially-shaped electrode having the outer electrode 43, and so on.

Second Embodiment Mode

Figure 22:
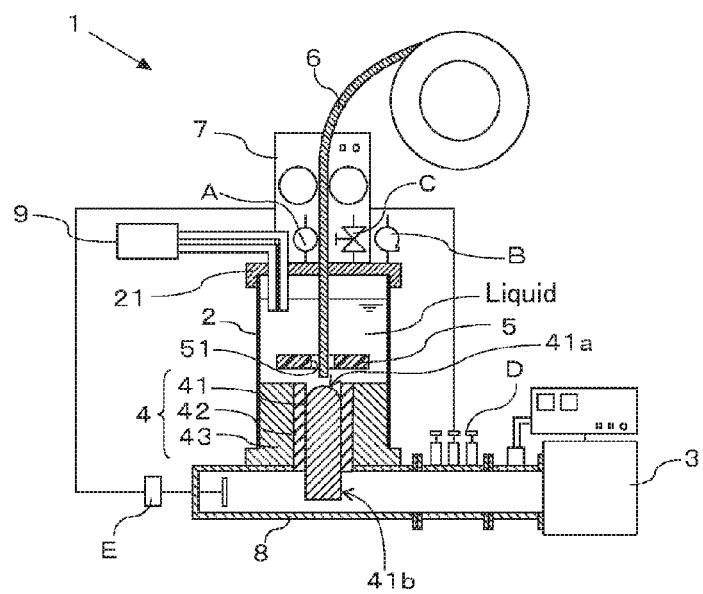
FIG. 22 is a schematic diagram for illustrating the constitution of a nanometer-size-particle production apparatus 10 according to a Second Embodiment Mode.

As illustrated in FIG. 22, a nanometer-size-particle production apparatus 10 according to a Second Embodiment Mode further comprises, in addition to the constituent elements in the nanometer-size-particle production apparatus 1 according to the First Embodiment Mode, a pump 9 (being equivalent to the "liquid circulation device") for not only supplying the liquid into the container 2 but also discharging the liquid from the container 2. This makes it possible to circulate the liquid continuously within the container 2, and thereby it becomes feasible to continuously synthesize nanometer-size particles furthermore effectively. It is possible to apply the modified embodiments to the Second Embodiment Mode as well in the same manner as the First Embodiment Mode.

EXPLANATION ON REFERENCE NUMERALS

1, and 10: Nanometer-size-particle Production Apparatuses;
2: Container; 3: Microwave Generation Device (i.e., Electromagnetic-wave Generation Device);
4: Electrode; 41: Inner Conductor (i.e., Electrode Conductor); 41a: Leading-end Section;
42: Dielectric; 43: Outer Conductor;
5: Plate (i.e., Covering Portion); 51: Through Hole;
6: Metallic Wire (i.e., Metallic Chip); 7: Feed Device;
8: Waveguide; 9: Pump (i.e., Liquid Circulation Device);
"A": Pressure Gauge; "B": Vacuum Pump; Pressure Adjustment Valve;
"D": Stub Tuner; and "E": Plunger

The invention claimed is:

1. A nanometer-size-particle production process for synthesizing nanometer-size particles in a liquid by means of plasma in the liquid, the nanometer-size-particle production process including:

a disposition step of face-to-face disposing, within said liquid, a metallic chip above a leading-end upside of an electrode conductor in which a covering portion is disposed;

a supply step of supplying a high-frequency wave, or a microwave, into said liquid by way of said electrode conductor to generate plasma; and a feed step of continuously feeding out said metallic chip toward said electrode conductor while supplying said high-frequency wave, or said microwave, into said liquid;

a leading-end section of said electrode conductor having a configuration that is a non-edge configuration that does not have any corners; and said electrode conductor, except for the leading-end section, having an axially-orthogonal cross-sectional area that is larger than an axially-orthogonal cross-sectional area of said metallic chip.

2. The nanometer-size-particle production process according to claim 1, wherein:
said liquid being pure water; and
said metallic chip being formed of zinc.

3. The nanometer-size-particle production process according to claim 1, wherein:
said liquid being pure water; and
said metallic chip being formed of magnesium.

4. The nanometer-size-particle production process according to claim 1, wherein:
a feed rate of said metallic chip toward said electrode conductor is based on a power for causing the plasma to generate.

\* \* \* \* \*